(12) United States Patent
Russell et al.

(10) Patent No.: US 11,007,472 B2
(45) Date of Patent: May 18, 2021

(54) ADSORPTION VESSELS HAVING REDUCED VOID VOLUME THROUGH THE USE OF NON-POROUS, LOW-DENSITY FILLER MATERIAL TO REDUCE VOIDS

(71) Applicant: UOP LLC, Des Plaines, IL (US)

(72) Inventors: Bradley P. Russell, Wheaton, IL (US); David W. Greer, Cary, IL (US); Shain-Jer Doong, Kildeer, IL (US)

(73) Assignee: UOP LLC, Des Plaines, IL (US)

( * ) Notice: Subject to any disclaimer, the term of this patent is extended or adjusted under 35 U.S.C. 154(b) by 246 days.

(21) Appl. No.: 16/392,368

(22) Filed: Apr. 23, 2019

(65) Prior Publication Data

US 2020/0101413 A1    Apr. 2, 2020

Related U.S. Application Data

(60) Provisional application No. 62/738,996, filed on Sep. 28, 2018.

(51) Int. Cl.
*B01D 53/04* (2006.01)
*B01D 53/047* (2006.01)

(52) U.S. Cl.
CPC ......... *B01D 53/0446* (2013.01); *B01D 53/04* (2013.01); *B01D 53/047* (2013.01); *B01D 53/0423* (2013.01)

(58) Field of Classification Search
CPC .. B01D 53/04; B01D 53/047; B01D 53/0423; B01D 53/0446
USPC ............................................................ 95/96
See application file for complete search history.

(56) References Cited

U.S. PATENT DOCUMENTS

| | | |
|---|---|---|
| 4,350,500 A | 9/1982 | Esselink |
| 6,334,889 B1 | 1/2002 | Smolarek et al. |
| 7,393,394 B2 | 7/2008 | Nowobilski et al. |
| 9,168,483 B2 | 10/2015 | Ravikovitch et al. |
| 2007/0095212 A1 | 5/2007 | Nowobilski et al. |

FOREIGN PATENT DOCUMENTS

| | | | |
|---|---|---|---|
| CN | 1221304 C | 10/2005 | |
| CN | 204073785 U | * 1/2015 | ........... B01D 53/047 |

OTHER PUBLICATIONS

International Search Report and Written Opinion for PCT/US2019/053334 dated Jan. 9, 2020 corresponding to present application.

\* cited by examiner

*Primary Examiner* — Robert A Hopkins
(74) *Attorney, Agent, or Firm* — Paschall & Associates LLC; James C. Paschall

(57) ABSTRACT

Adsorption vessels and systems utilizing adsorption vessels are provided herein. In one embodiment, an adsorption vessel for receiving a fluid mixture and for separating a component from therein includes a vessel wall extending from a bottom end to a top end and defining a vessel chamber. A bottom inlet is formed in the bottom end of the adsorption vessel for introducing the fluid mixture to the vessel chamber. A filler material having a total porosity of less than about 25% and a density less than about 900 kg/m3 or an insert or both are positioned in the top void volume to increase overall performance of the adsorbent vessel.

10 Claims, 1 Drawing Sheet

ADSORPTION VESSELS HAVING REDUCED VOID VOLUME THROUGH THE USE OF NON-POROUS, LOW-DENSITY FILLER MATERIAL TO REDUCE VOIDS

This application claims priority to provisional application 62/738,996, filed Sep. 28, 2018, which is incorporated herein in its entirety.

BACKGROUND

The present invention relates generally to pressure swing adsorption (PSA) systems and vessels, and more particularly relates to PSA vessels having reduced void volume and uniform flow through the use of an inexpensive, inert and light-weight material.

Pressure swing adsorption processes can separate selectively adsorbable components, such as carbon monoxide, carbon dioxide, argon, nitrogen, light hydrocarbons such as methane, ethane, and propane, and water, from gas mixtures. Often, one or more of these components are adsorbed to purify a fluid stream, such as hydrogen gas. Typically, a PSA process uses an adsorber that includes a vessel surrounding an adsorbent bed formed with adsorbent particles. Generally, void volumes in the adsorber vessel include volumes within porous adsorbent particles, volumes between particles, and internal volumes defined by the walls of the vessel and the adsorbent bed.

These void volumes can decrease the efficiency of the PSA process. Specifically, the void volumes may lead to loss of recovered product such as hydrogen. In some instances, it has been found that adsorber vessels are being used that are over-sized even a factor of 2 or 3 times the size needed for a particular situation. One solution would be to fill the adsorbent vessel with significantly greater quantities of adsorbent than are necessary for the particular separation being accomplished. However, although adsorbent can be placed in the void volume to reduce the void volume, such a solution is undesirable as it may increase hydrogen storage within the vessel thereby increasing hydrogen loss, and adversely affect the gas flow distribution and pressure drop through the adsorbent bed as well as significantly increasing the costs. A second solution would be to have significant empty space within the vessel. This is less than desirable due to the potential for losses of hydrogen. Prior art methods such as shown in U.S. Pat. No. 7,393,394B2 rely on internal structures such as a perforated baffle. In CN1221304C there is referenced the use of an inert filler. However, the reference does not mention any specific density requirement and does mention using metal filler (high density). In addition, the Chinese patent reference mentions the use of adsorbent materials for the filler which would have the potential to adsorb product. Other methods required the use of a dense filler material that would have an excessive weight. A solution has now been found for this problem in the present invention.

BRIEF SUMMARY

Adsorption vessels having reduced void volume and uniform flow distribution are provided herein. Two configurations are provided for adsorbent vessels that have significant empty volume above the adsorbent that is contained in the vessels. In one configuration, a volume above the adsorbent is filled with loose fill such as plastic pellets or shredded tires. The volume of the loose fill may be up to two or three times the volume of the adsorbent. The filler material is low density so as to not unnecessarily compress the adsorbent and to not settle or mix with the adsorbent layer over time and is of relatively low porosity. All or a portion of the space above the adsorbent in the adsorbent vessel may be occupied by a spacer such as a cylindrical spacer that is then surrounded by a quantity of the filler material.

BRIEF DESCRIPTION OF THE DRAWINGS

The adsorption vessels will hereinafter be described in conjunction with the following drawing figures, wherein like numerals denote like elements, and wherein.

DETAILED DESCRIPTION

Figure 3:
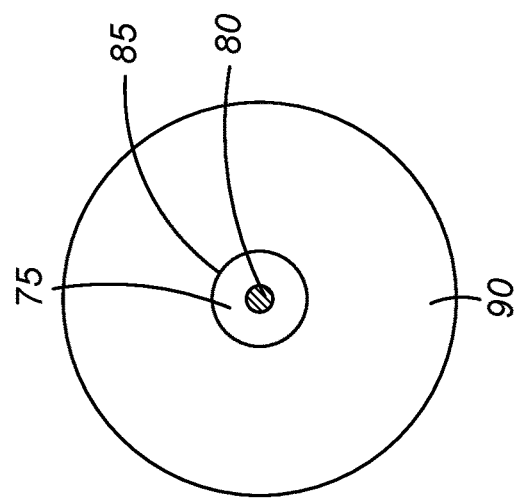
FIG. 3 shows a top view of the adsorption vessel of FIG. 2.

The following detailed description is merely exemplary in nature and is not intended to limit the adsorbent system or adsorbent vessel or the application and uses of the adsorbent system or adsorbent vessel. Furthermore, there is no intention to be bound by any theory presented in the preceding background or the following detailed description.

The various embodiments contemplated herein relate to adsorption vessels and systems that have reduced void volume, exhibit reduced pressure drop, and provide uniform flow distribution. The adsorption vessels herein utilize filler material or inserts to reduce significant void volume, leading to improved process performance in PSA processes and allowing for the use of effective quantities of adsorbent in larger than necessary adsorbent vessels. The filler material has a total internal porosity of less than about 25%, such as less than about 20%, less than about 15%, or less than or preferably about 10% or less. As used herein, "total porosity" is a measure of the void volume, including intramaterial void volume within material particles, as a percentage of the total volume of the filler material. The total volume, or bulk volume, of the filler material includes the solid and void components.

PSA technology is based upon the capacity of adsorbents to selectively adsorb and desorb particular gases as gas pressure is raised and lowered. Due to selective adsorption, impurities may be removed from a desired product gas. In many commercial uses of PSA systems, off gas from refineries or chemical plants is fed into a PSA system for separation. In an exemplary use, the feed is the product gas from a steam methane reformer and includes about 75 mol % hydrogen, about 15 mol % carbon dioxide, about 3 to 4 mol % carbon monoxide, about 5 mol % methane, and about 0.5 mol % nitrogen. The PSA system is able to separate a product stream of 99.9 mol % hydrogen from such a feed.

The PSA process involves a cyclic repetition of four basic steps: production, depressurizing, purging, and repressurizing. First, the feed gas mixture is fed under high pressure into vessels containing adsorbent material, typically alumina, silica gel, activated carbon, molecular sieves, or the like. Impurities in the feed gas adsorb onto the internal surfaces of the porous adsorbent, leaving purified product gas in the void spaces of the vessel. Product gas is then withdrawn from the top of the vessel under pressure. The pressure in the adsorption vessels is then reduced, and product gas remaining in the void spaces of the vessel is removed. The adsorbed impurities are released back into the gas phase, regenerating the adsorbent bed. The vessel is then purged with a small amount of purified product gas or internally generated purge gas, to complete regeneration of the adsorbent bed. Impurities exit the PSA process in a low-pressure exhaust stream. Finally, the vessel is repressurized with a mixture of product gas from the depressurization step, feed gas, and high-purity product gas. This cycle is repeated about every 5 to 10 minutes in conventional PSA systems.

Because each cycle is essentially a batch process, multiple pressure vessels are typically used together in sequence to provide a continuous flow of product gas. In addition, large surge tanks are used to dampen variations in flows of exhaust streams. To fully utilize the adsorbent material employed, PSA systems require uniform flow of gas across the adsorbent vessel(s) throughout the PSA processing cycle. In addition, void volume and pressure drops in the PSA vessel entrance and exit regions (i.e., the inlets and outlets and their associated headers) have adverse effects on the process performance of a PSA system and must be minimized in practical commercial operations.

As shown in this invention, two possible main configurations are taught by the present invention: (1) loose fill or filler material, and (2) mechanical inserts. In both cases, a key feature of the invention is the location of the filler relative to adsorbent. From computer simulations and pilot plant testing of PSA cycles, it has been found that the negative impact of vessel voids on hydrogen recovery is lessened if the voids are above the adsorbent layers (i.e., at the product end or top of the vessel). Therefore, adsorbent is loaded as close as possible to the feed inlet, with any excess voidage located at the product end. In the case of a short-loaded vessel, this requires filler material to be placed above the adsorbent. As shown in the Figures, two possible configurations are shown: (1) loose fill, and (2) mechanical inserts. In both cases, a key feature of the invention is the location of filler relative to adsorbent. From computer simulations and pilot plant testing of PSA cycles, it has been determined that the negative impact of vessel voids on hydrogen recovery is lessened if the voids are above the adsorbent layers (i.e., at the product end of the vessel). Therefore, adsorbent is loaded as close as possible to the feed inlet on the lower part of the adsorbent vessel, with any excess voidage located at the product end. In the case of a short-loaded vessel, this requires filler material to be placed above the adsorbent layers.

Figure 2:
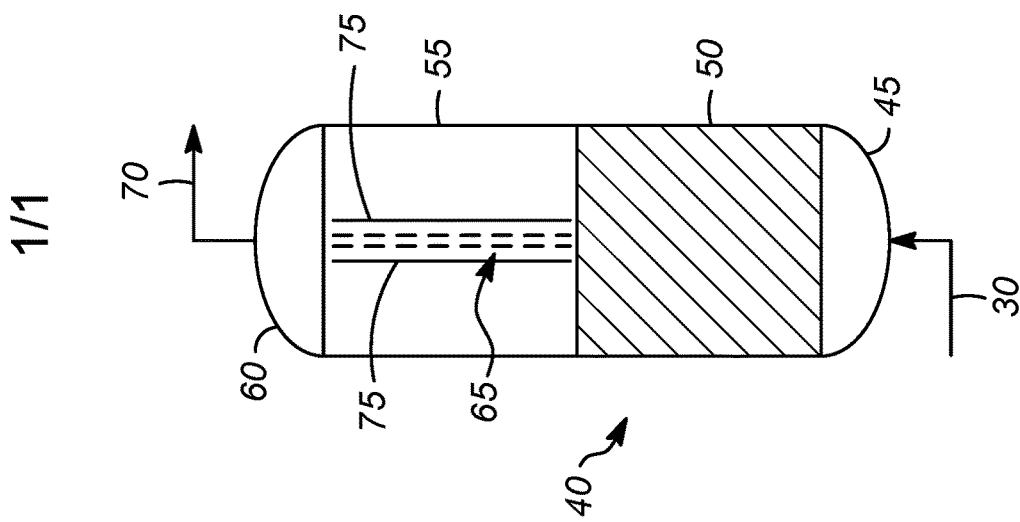
FIG. 2 is a side view of an adsorption vessel that has a center pipe and a removable insert accordance with an exemplary embodiment.
Figure 1:
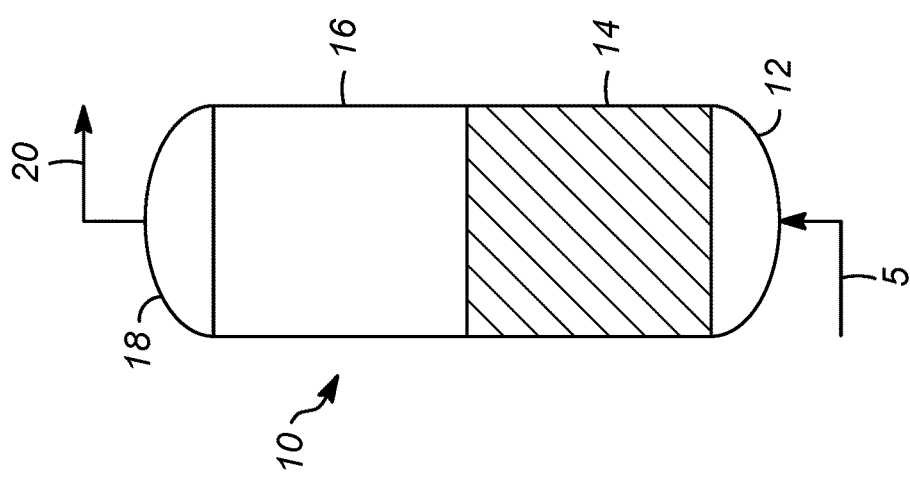
FIG. 1 is a schematic view of an adsorption vessel in accordance with one exemplary embodiment

In accordance with an exemplary embodiment contemplated herein, an adsorbent vessel 10 for performing selective adsorption is illustrated in FIG. 1. As shown, the system receives a feed stream 5 which enters a lower portion 12 of adsorbent vessel 10 and then passes up to adsorbent layers 14 through a layer of inert filler 16. Above inert filler layer 16 is shown an upper portion 18 of the adsorbent vessel 10 and a stream 20 of product hydrogen exiting the top of adsorbent vessel 10. FIG. 2 shows an adsorbent vessel 40 receives a feed stream 30 which enters a lower portion 45 of adsorbent vessel 40 and then passes up to adsorbent layers 50 through a layer of inert filler 55. Above inert filler layer 55 is shown an upper portion 60 of the adsorbent vessel 40 and a stream 70 of product hydrogen exiting the top of adsorbent vessel 10. Also shown is center pipe 65 and removable insert 75. FIG. 3 shows a top view of FIG. 2 with a top portion 90, center pipe 80 for gas flow and removable insert 75 which can be wide enough for an extended manway to be inserted during loading of the adsorbent vessel with adsorbent and inert filler material.

The filler material may be, for example, polymeric closed cell foams, plastic blocks, plastic pellets or granules, rubber granules, or combinations thereof. As stated above, the total porosity of the filler material, whether a single material or combination of materials, is less than about 25%, such as less than 20%, less than 15%, or less than 10%.

Accordingly, adsorbent systems and vessels for separating impurities from a product gas have been described. The adsorbent vessels are provided with filler material for reducing void volume to improve processing efficiency. While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of filing this patent application.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is an adsorption vessel for receiving a fluid mixture and for separating a component from therein, the adsorption vessel comprising a vessel wall extending from a bottom end to a top end and defining a vessel chamber wherein the vessel wall is in a cylindrical configuration; a bottom inlet formed in the bottom end of the vessel for introducing the fluid mixture to the vessel chamber; a top outlet formed in the top end for product hydrogen exiting the adsorption vessel; a quantity of adsorbent material occupying a lower region of the adsorbent vessel; and a non-porous filler material, with a loaded density less than about 900 kg/m³ to occupy an upper region above the quantity of adsorbent material. An embodiment of the invention is one, any or all of prior embodiments in this paragraph up through the first embodiment in this paragraph further comprising a center pipe extending from the top end to the bottom end of the adsorption vessel for passage of a gas. An embodiment of the invention is one, any or all of prior embodiments in this paragraph up through the first embodiment in this paragraph wherein an insert occupies a center portion of the adsorption vessel spaced from the center pipe. An embodiment of the invention is one, any or all of prior embodiments in this paragraph up through the first embodiment in this paragraph wherein the filler material, insert or both occupy from about 20 to 80 vol % of the adsorbent vessel. An embodiment of the invention is one, any or all of prior embodiments in this paragraph up through the first embodiment in this paragraph wherein the filler material, insert or both occupy from about 30 to 70 vol % of the adsorbent vessel. An embodiment of the invention is one, any or all of prior embodiments in this paragraph up through the first embodiment in this paragraph wherein the filler material, insert or both occupy from about 40 to 60 vol % of the adsorbent vessel. An embodiment of the invention is one, any or all of prior embodiments in this paragraph up through the first embodiment in this paragraph wherein the filler material has an internal porosity of less than about 20%. An embodiment of the invention is one, any or all of prior embodiments in this paragraph up through the first embodiment in this paragraph wherein the filler material has an internal porosity of less than about 10%. An embodiment of the invention is one, any or all of prior embodiments in this paragraph up through the first embodiment in this paragraph wherein the filler material is chosen from the group comprising polymeric closed cell foams, plastic blocks, plastic pellets, plastic granules, rubber granules, and mixtures thereof. An embodiment of the invention is one, any or all of prior embodiments in this paragraph up through the first embodiment in this paragraph, further comprising at least one of: sensing at least one parameter of the process and generating a signal from the sensing; sensing at least one parameter of the process and generating data from the sensing; generating and transmitting a signal; generating and transmitting data.

The invention claimed is:

1. An adsorption vessel for receiving a fluid mixture and for separating a component from therein, the adsorption vessel comprising:
    a vessel wall extending from a bottom end to a top end and defining a vessel chamber wherein said vessel wall is in a cylindrical configuration;
    a bottom inlet formed in the bottom end of the vessel for introducing the fluid mixture to the vessel chamber;
    a top outlet formed in the top end for product hydrogen exiting the adsorption vessel;
    a quantity of adsorbent material occupying a lower region of said adsorbent vessel; and
    a nonporous filler material with a loaded density less than about 900 kg/m3 to occupy an upper region above said quantity of adsorbent material.

2. The adsorption vessel of claim 1 further comprising an insert with a center pipe extending from said top end to said adsorbent material of said adsorption vessel for passage of a gas.

3. The adsorption vessel of claim 2 wherein an insert occupies a center portion of said adsorption vessel spaced from said center pipe.

4. The adsorption vessel of claim 1 wherein the filler material occupies from about 20 to 80 vol % of said adsorbent vessel.

5. The adsorption vessel of claim 1 wherein the filler material occupies from about 30 to 70 vol % of said adsorbent vessel.

6. The adsorption vessel of claim 1 wherein the filler material occupies from about 40 to 60 vol % of said adsorbent vessel.

7. The adsorption vessel of claim 1 wherein said filler material has an internal porosity of less than about 20%.

8. The adsorption vessel of claim 1 wherein said filler material has an internal porosity of less than about 10%.

9. The adsorption vessel of claim 1 wherein the filler material is chosen from the group comprising polymeric closed cell foams, plastic blocks, plastic pellets, plastic granules, rubber granules, and mixtures thereof.

10. The process of claim 1, further comprising at least one of:
    sensing at least one parameter of the process and generating a signal from the sensing;
    sensing at least one parameter of the process and generating data from the sensing;
    generating and transmitting a signal;
    generating and transmitting data.

* * * * *